(12) United States Patent
Wilkinson

(10) Patent No.: US 7,627,432 B2
(45) Date of Patent: Dec. 1, 2009

(54) SYSTEM AND METHOD FOR COMPUTING ANALYTICS ON STRUCTURED DATA

(75) Inventor: Leland Wilkinson, Chicago, IL (US)

(73) Assignee: SPSS Inc., Chicago, IL (US)

( * ) Notice: Subject to any disclaimer, the term of this patent is extended or adjusted under 35 U.S.C. 154(b) by 85 days.

(21) Appl. No.: 11/515,333

(22) Filed: Sep. 1, 2006

(65) Prior Publication Data

US 2008/0059115 A1  Mar. 6, 2008

(51) Int. Cl.
*G01V 1/00* (2006.01)

(52) U.S. Cl. ......................................................... 702/14

(58) Field of Classification Search .................. 702/14; 704/245
See application file for complete search history.

(56) References Cited

U.S. PATENT DOCUMENTS

| | | | |
|---|---|---|---|
| 5,987,242 A | 11/1999 | Bentley et al. | |
| 6,044,366 A | 3/2000 | Graffe et al. | |
| 6,078,924 A | 6/2000 | Ainsbury et al. | |
| 6,560,616 B1 | 5/2003 | Garber | |
| 6,564,209 B1 | 5/2003 | Dempski et al. | |
| 6,681,230 B1 | 1/2004 | Blott et al. | |
| 6,721,726 B1 | 4/2004 | Swaminathan et al. | |
| 6,859,455 B1 | 2/2005 | Yazdani et al. | |
| 6,900,807 B1 | 5/2005 | Liongosari et al. | |
| 6,993,534 B2 | 1/2006 | Denesuk et al. | |
| 7,024,417 B1 | 4/2006 | Russakovsky et al. | |
| 2002/0087567 A1 | 7/2002 | Spiegler et al. | |
| 2002/0128998 A1 | 9/2002 | Kil et al. | |
| 2002/0129017 A1 | 9/2002 | Kil et al. | |
| 2002/0138492 A1 | 9/2002 | Kil | |
| 2003/0018928 A1 | 1/2003 | James et al. | |
| 2003/0061212 A1 | 3/2003 | Smith et al. | |
| 2003/0182310 A1 | 9/2003 | Charnock et al. | |
| 2003/0225743 A1 | 12/2003 | Inokuchi | |
| 2005/0097140 A1 | 5/2005 | Jarl | |
| 2007/0043565 A1* | 2/2007 | Aggarwal et al. ........... 704/245 |

* cited by examiner

*Primary Examiner*—Tung S Lau
*Assistant Examiner*—Xiuquin Sun
(74) *Attorney, Agent, or Firm*—Ryndak & Suri LLP

(57) ABSTRACT

A system, method and computer storage medium are provided for computing analytics on structured data from at least one data source. Statistical estimates are computed using a statistics object. Software is provided which is capable of performing any of the data processing methods selected from the pass, stream and merge methods and performing at least one statistical calculation on data from the data source using the statistics object to compute statistical estimates by at least one method selected from the provided data processing methods.

30 Claims, 9 Drawing Sheets

SYSTEM AND METHOD FOR COMPUTING ANALYTICS ON STRUCTURED DATA

FIELD OF THE INVENTION

The present invention relates to a system and method for computing analytics on structured data. More particularly, the present invention relates to an integrated architecture for analytic software for performing statistical calculations on large datasets, streaming data and distributed data sources in a single code base.

BACKGROUND OF THE INVENTION

Classical statistical software packages were designed for analyzing moderately large datasets stored as tables of data. Well-known examples of such statistical software packages include solutions available from SPSS, Inc. and SAS Institute, Inc. The tables of data contained variables to be analyzed in their columns and cases (or observations) in their rows. In addition, these tables were designed to contain columns of grouping variables, which in the case of a dataset for a company's sales contacts might include, for example, gender, company name or sales region.

More recent analytic systems were designed to handle larger tables stored in large databases and data warehouses. To improve performance and scalability, these systems employed specialized algorithms that required only one pass through the rows of the data table in order to calculate statistical estimates.

Recently, data sources have expanded beyond the capacity of even large databases, and as a result, enterprise applications require new architectures for analytic software. Statistical and data mining software designed for the data warehouse and the client-server setting cannot meet the demands of this new environment. Specifically, enterprise applications must be able to handle (1) large datasets (e.g., more than a billion rows); (2) streaming data sources (e.g., web packets, scientific data from automated sensors and collection devices, etc.); (3) distributed and heterogeneous data sources (e.g., text, network traffic, sensor networks, etc.); (4) distributed computing environments (multi-processor, multi-server, and grid computing); (5) real-time scoring (in the one- or two-hundreds of milliseconds timeframe); and (6) data flow (linear chained) and directed-acyclic-graph (DAG) analytic processing. These diverse requirements have stimulated development of scientific and commercial systems tailored to specific applications. There now exist systems for grid computing (especially in scientific applications), for streaming data (especially in financial applications), and for data-flow (especially in desktop applications such as Clementine, SAS Enterprise Miner, and Microsoft Analytic Services).

Not only is the sheer quantity of data increasing, but the rate at which the data is collected is also increasing, so that it is often necessary to handle data that is streaming in real time. In some applications, the data must be analyzed rapidly, often at or near real time speed, in order to have the most value to the user. As mentioned above, this may require scoring in one- or two-hundreds of milliseconds.

Two approaches to dealing with these massive data sources have emerged. First, streaming data algorithms have been designed to analyze real-time data streams. These algorithms usually operate on a fixed-width window of data observations. They update their calculations to include new cases entering this window in real time. Second, grid and parallel computing algorithms have been developed to parcel large data sources into smaller packets of rows so that statistical algorithms can be applied to the packets separately. These algorithms are designed so that the results of their calculations can be merged in a final series of steps to produce a result that is equivalent to what would have been calculated across all rows of the original massive data source in one pass. To date, these two approaches have been separate and customized for their respective particular applications.

Thus, there are three environments or modes of interest, each with its own requirements: (i) large databases, requiring calculation in a single pass through the rows of data (hereinafter sometimes referred to as "Pass"); (ii) streaming data sources, requiring analysis of a real-time data stream ("Stream"); and (iii) distributed data sets, requiring merging calculations from individual packets ("Merge"). In the past, separate algorithms for dealing with a single one of these three modes were customized because of the different operating requirements unique to each environment (i.e., transactional databases, real time, and distributed computing, respectively). The cost of developing and maintaining custom solutions tends to be high, and because the customized solution is typically limited to a specific application, the cost cannot be amortized across a number of different applications. Further, custom solutions tend to be inflexible, making it difficult and expensive to modify them to adapt to a user's changing needs. For example, existing systems operate for only one of grid computing, for streaming data, and for data flow and are tailored to specific applications, and thus not readily useful for other settings.

Accordingly, a need exists for an improved, flexible system and method for computing analytics on structured data that is capable of handling more than one of massive database tables, real-time data streams and distributed sources.

SUMMARY OF THE INVENTION

In accordance with the present invention, a system and method which integrate the Pass, Stream and Merge methods to handle multiple data environments, to enhance overall efficiency of the analytic system, increase calculation speed, and conserve data storage and processing resources is provided. The invention can reduce program code duplication across the three environments and can minimize the overall size of the analytic system.

In accordance with one aspect of the present invention, methods and products are provided that utilize or incorporate unique system architecture which implements three methods—Pass, Stream and Merge, as hereafter defined—for every analytic algorithm and exploits common calculations across the three environments. The methods may be used alone or in combination, depending on the application. The architecture localizes statistical calculations to common object primitives (such as mean, standard deviation, minimum and maximum, etc.). Each of these statistics objects not only handles to the requirements of the Merge operation but also persists statistical calculations so that the Pass and Stream operations can be performed without revisiting the rows of the database already entered into the calculations.

The Pass method makes one pass through a dataset and produces estimates of a statistical or analytic model. Multipass algorithms are not allowed. In-memory storage of model statistics (coefficients, standard errors, etc.) is allowed, but not in-memory data tables.

The Stream method maintains a dynamic model in which estimates may be updated through a table of one or more tuples of incoming data. Estimates may also be downdated in a similar manner by removing the contributions of one or more tuples of data. A combination of updating (for new data)

and downdating (for old data) revises a model to fit a moving data stream. Because updating and downdating are independently settable, a variety of streaming models can be constructed.

The Merge method combines two models. This combination is done without passing through any data. Merging is designed to work hierarchically (two by two by two . . . ) so that analytics of the invention can compute models in a distributed environment. The order of merges is arbitrary and may be determined by a central supervisor or by the analytics themselves.

An application written in accordance with the architecture of the invention preferably will produce the same or substantially the same answer with any of the three methods (Pass, Stream and Merge). For analytics based on sufficient statistics (e.g., linear regression, discriminant analysis, principal components), this typically can be met exactly with closed-form solutions. For other procedures that cannot be programmed practically for large datasets in one pass (e.g., decision trees, logistic regression), typically this requirement can only be met approximately, meaning to an acceptable degree of precision, typically within one standard error of the estimate obtainable from the entire dataset.

In another aspect of the invention, each model, whether produced by Pass, Stream or Merge, is scored by an accompanying scoring component. This component is capable of scoring a single tuple of data (one row) or a table of data (multiple rows). The scoring components implement only the Pass method, because updating a score requires recalculating it using precomputed model estimates. Scoring components may be streamed with analytic components so that both scores and models are computed on the fly.

In another aspect of the invention, duplication of program code is minimized and the overall size of the analytic system is reduced.

In accordance with one aspect of the present invention, a method for computing analytics on structured data is provided. The method includes providing at least one data source, providing a statistics object for computing statistical estimates, providing software capable of performing any of three data processing methods selected from pass, stream and merge methods and performing at least one statistical calculation on data from the data source using the statistics object to compute statistical estimates by at least one method selected from the provided data processing methods.

In accordance with another aspect of the invention, a data processing system for computing analytics on structured data is provided. The data processing system includes at least one data source, at least one statistics object for computing statistical estimates on data from the data source, computer software capable of performing any of three data processing methods selected from the group of the pass, stream and merge methods, and wherein each statistics object performs at least one statistical calculation on data from the data source to compute statistical estimates by at least one method selected from the provided data processing methods.

In accordance with still another aspect of the present invention, a storage medium for computer software encoded in a machine readable format for analyzing structured data is provided. The storage medium comprises a set of computer instructions for retrieving data from at least one data source, a set of computer instructions for constructing at least one statistics object for computing statistical estimates, a set of computer instructions for performing any of three data processing methods selected from the group consisting of pass, stream and merge methods and a set of computer instructions for instructing the statistics object to perform at least one statistical calculation on data from the data source to compute statistical estimates by at least one method selected from the at least two data processing methods.

DETAILED DESCRIPTION OF THE INVENTION

Figure 1:
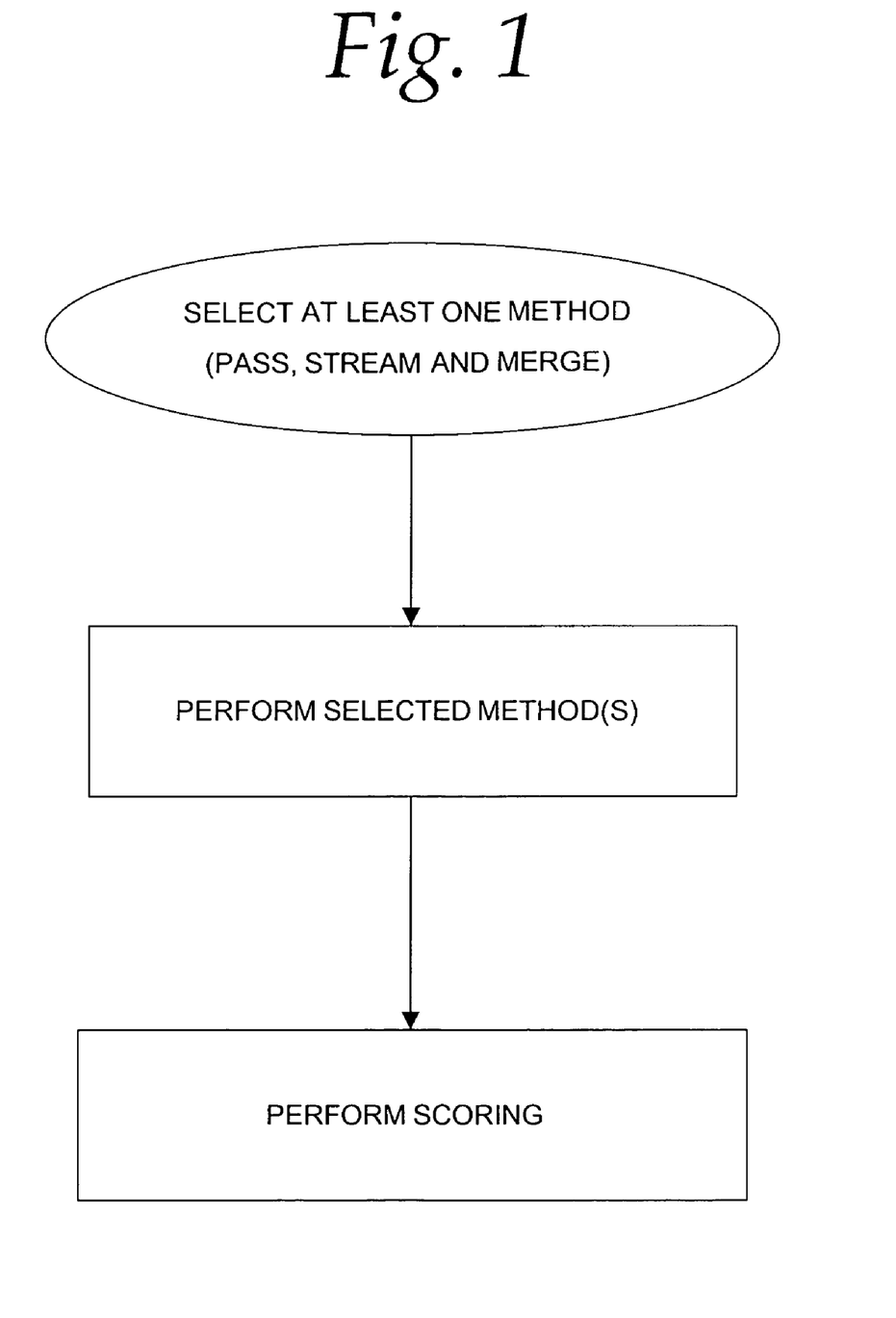
FIG. 1 is a block diagram of the Pass-Stream-Merge ("PSM") architecture of the invention.

In accordance with the present invention, a new and useful architecture for analytic software is provided which combines Pass, Stream and Merge methods in a single component, referred to herein as PSM, as shown in FIG. 1.

PSM is preferably implemented in Java for speed and maintainability. Although PSM may be implemented in other languages, timing tests using Java machines incorporating Hot Spot technology have indicated that Java implementations provide comparable or superior performance to FORTRAN and C++ implementations of the same algorithms.

The sequence of operations needed to analyze data in each of the three methods, Pass, Stream and Merge, will now be described with reference to the flowcharts in FIGS. 2, 3 and 4, respectively.

The Pass method operates similarly to most one-pass data mining applications. Sufficient statistics for computing a model are initialized and then updated row-by-row as tuples are read from the data source. Computing these statistics requires close attention to accurate one-pass algorithms. For example, the following is a sample of code for computing basic statistics:

```
Iterator iter = input.getIterator( ) ;
while (iter.hasNext( ) ) {
    Row row = (Row) iter.next ( ) ;
    double weight = row.getWeight ( ) ;
    double [ ] data = row.getContinuousData ( ) ;
    if (weight > 0 {
        for (int j = 0; j < numContinuousVariables; j++) {
            if (!Double.isNaN(data[j])) {
                weightedCount[j] += weight;
                simpleCount[j] ++;
                double xj = weight * (data[j] – means[j]) ;
                means[j] += xj /weightedCount[j] ;
                sumOfSquares[j] += xj * (data[j] – means[j]) ;
```

-continued

```
        }
      }
    }
}
```

As shown in this code snippet, all computations in PSM handle missing values and case (row) weights. How to treat missing values and weights is up to the algorithm's designer. Pass methods are given a single iterator that operates over a data source. This iterator may not be reset. For each row, there is a getContinuousData( ), a getCategoricalData( ), and a getObjectData( ) method for accessing a tuple of data.

For analytics that are not scalable to large datasets, there is a binning analytic available to pre-bin the data. This analytic creates a separate bin for every instance of a set of categorical data values. Within each categorical bin, the analytic compresses continuous values into a small number of clusters. The binning analytic is dynamically adaptive; it modifies within-cluster distances (by using a Euclidean ball) in order to keep the number of bins within an acceptable level.

Each cluster is accompanied by a weight variable containing the number of rows in that cluster so that subsequent analytics can produce proper results. The binning analytic can be used to bin a dataset independently or it can be incorporated into new analytics that require binning before computation. For example, a cluster analytic or a decision tree analytic may use binning so that they require only one pass through the dataset.

Figure 2:
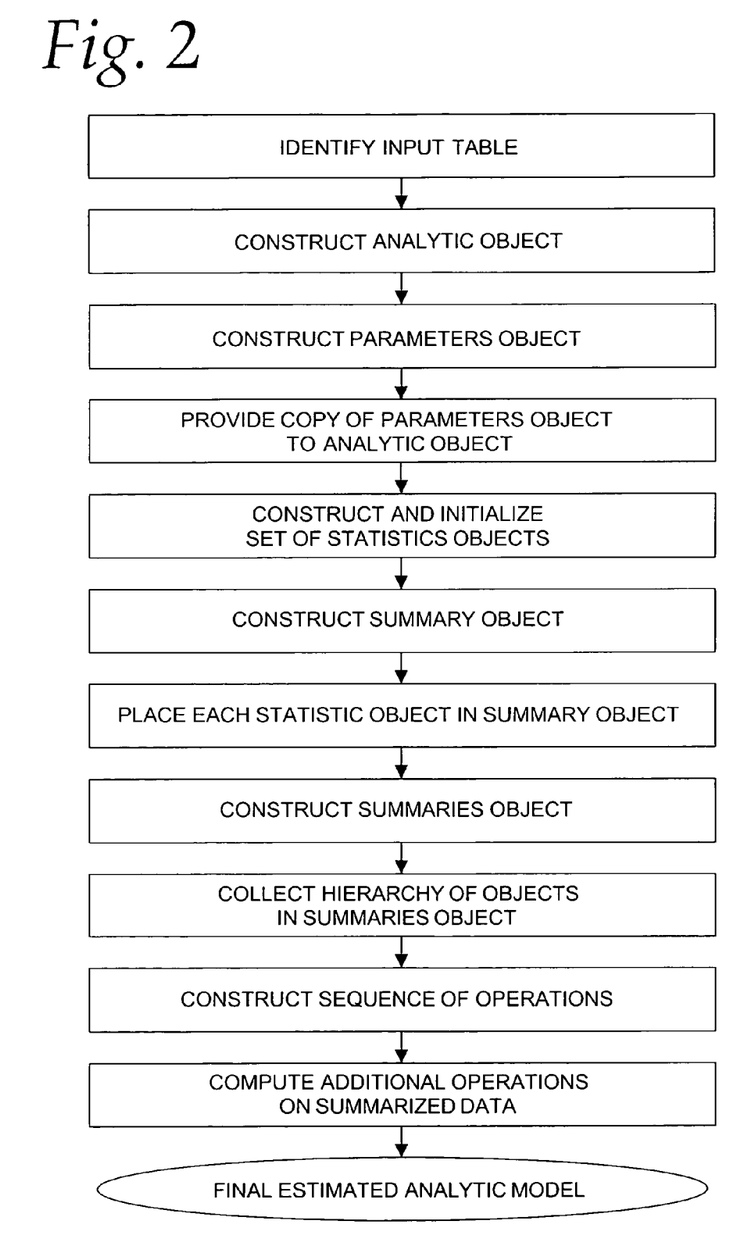
FIG. 2 is a flowchart of the Pass method of the PSM architecture.

As shown in FIG. 2, before invoking the Pass mode, several preliminary steps are required. First, an input data table is identified. Second, an Analytic object, such as Regression, Principal Components, etc., is constructed. Third, a Parameters object is constructed to specify parameters for the analysis, e.g., number of predictor variables, number of components, etc. Fourth, a copy of the Parameters object is provided to the Analytic object.

The Pass method of the Analytic is then invoked on the identified data table. The Pass method first constructs and initializes a set of Statistics objects needed for its statistical calculations. A Statistics object is an encapsulated software object for computing statistical estimates. This class of objects is designed to be able to merge computational results from peer statistics objects operating on related tables of data derived from a common population. Next, the Pass method constructs a Summary object for containing a collection of statistical objects and places each Statistics object in the Summary object. If the Parameters object includes a grouping variable, the Pass method performs the two previous steps separately for each group. The Pass method then collects the entire hierarchy of objects constructed so far into an overall Summaries object, which is used for grouping Summary objects based on a categorical variable or a field containing category codes.

Next, the Pass method constructs a sequence of operations using the Statistics objects in order to compute the required Analytic algorithm. If a grouping variable is present in the Parameters object, the Pass method structures the sequence of operations to be performed separately for each group. The sequence of sub-algorithms is executed sequentially on each row of the input data table, and the Summaries object is instructed to collect the results of all the sub-analyses. Finally, the Pass method computes additional operations on the summarized data in order to produce a final estimated analytic model.

Figure 3:
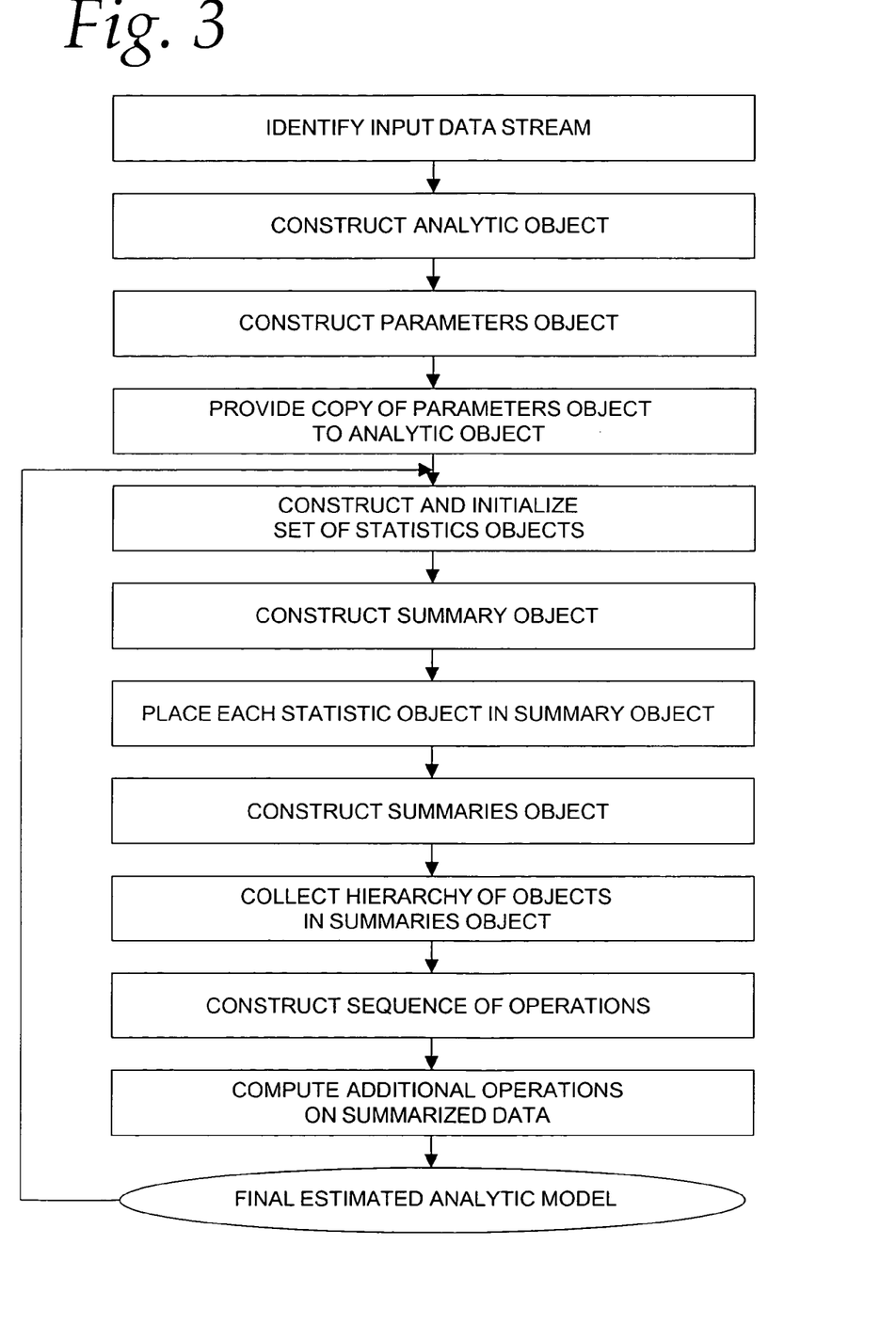
FIG. 3 is a flowchart of the Stream method of the PSM architecture.

The Stream method is shown in the flowchart of FIG. 3. Handling streaming data requires a method of updating and downdating model statistics without re-reading the data. In order to deal with this situation, estimates for tuples to be added need to be incremented and estimates for tuples to be removed need to be decremented. To do so, the code snippet shown above for the Pass method may be extended as follows:

```
Iterator iter = input.getIterator( );
while (iter.hasNext( ) ) {
    Row row = (Row) iter.next( );
    double weight = row.getWeight( );
    double [ ] data = row.getContinuousData ( );
    if (weight > 0) {
        for (int j = 0; j < numContinuousVariables; j++) ;
            if (!Double.isNaN(data[j])) {
                double xj = weight * (data[j] – means[j]) ;
                if (add) {
                    weightedCount[j] += weight ;
                    simpleCount[j] ++ ;
                    means[j] += xj / weightedCount[j] ;
                    sumOfSquares[j] += xj * (data[j] – means[j]) ;
                } else {
                    weightedCount[j] –= weight;
                    simpleCount[j] –– ;
                    means[j] –= xj / weightedCount[j] ;
                    sumOfSquares[j] –= xj * (data[j] – means[j]);
                }
            }
    }
}
```

As shown in FIG. 3, there are several preliminary steps in the Stream method. First, an input data stream is identified. Second, an Analytic object, such as Regression, Principal Components, etc., is constructed. Third, a Parameters object is constructed to specify parameters for the analysis, e.g., number of predictor variables, number of components, etc. Fourth, a copy of the Parameters object is provided to the Analytic object.

The Stream method of the Analytic is then invoked on the identified data stream. The Stream method first constructs and initializes a set of Statistics objects needed for its statistical calculations. Next, the Stream method constructs a Summary object and places each Statistic object in the Summary object. If the Parameters object includes a grouping variable, the Stream method performs the two previous steps separately for each group. The Stream method then collects the entire hierarchy of objects constructed so far into an overall Summaries object.

Next, the Stream method constructs a sequence of operations using the Statistics objects in order to compute the required Analytic algorithm. If a grouping variable is present in the Parameters object, the Stream method structures the sequence of operations to be performed separately for each group. The sequence of sub-algorithms is executed sequentially on each row of the input data stream. The input rows of the stream are separated into two exclusive groups. The first group consists of rows to be added to the existing analysis. The second group consists of rows to be removed from the existing analysis. Every PSM Analytic must therefore be capable of updating and downdating its calculations.

The Stream method instructs the Summaries object to collect the results of all the sub-analyses. The Stream method then computes additional operations on the summarized data in order to produce a final estimated analytic model. Finally, the Stream method is invoked again with additional row sets to be added and removed. This process is repeated and continues indefinitely.

Figure 4:
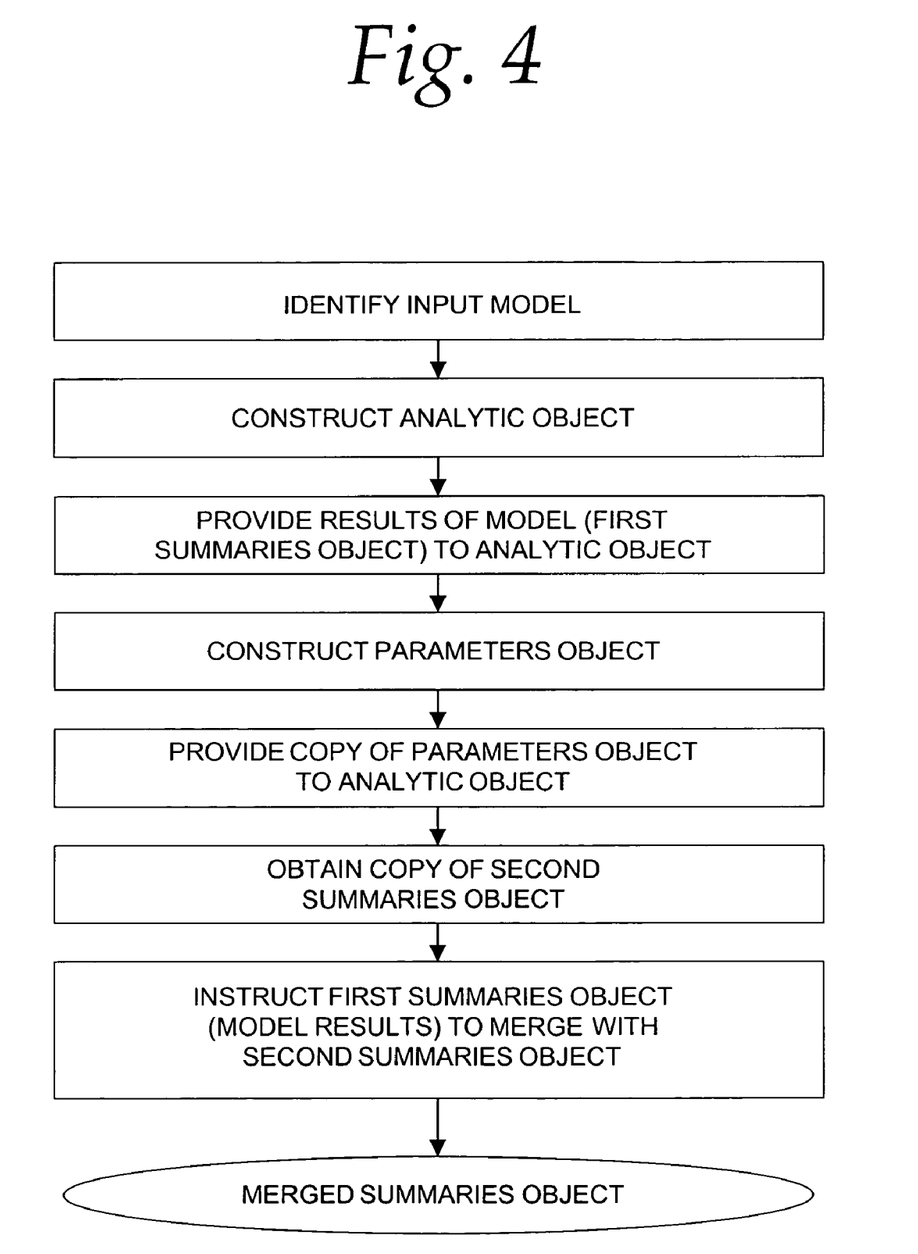
FIG. 4 is a flowchart of the Merge mode of the PSM architecture.

The Merge mode is illustrated in the flowchart of FIG. 4. The Merge method blends two model estimates together to produce the same (or distinguishable with low probability) estimates which would be obtained by concatenating the two data sources and doing one pass on the concatenated data source. The Merge mode of the PSM invention does not, however, re-read the data. Accomplishing such a merge requires a different approach for almost every analytic model. For simplicity, the PSM platform provides a set of classes for each type of basic statistic or model component. For example, a Means class implements sample mean computations and has a method for merging sample means. The Means class may be implemented as follows:

```
public void merge(Summary s1, Summary s2) {
    double[ ] means1 = Means.extractData(s1);
    double[ ] means2 = Means.extractData(s2);
    double[ ] wcounts1 = WeightedCounts.extractData(s1);
    double[ ] wcounts2 = WeightedCounts.extractData(s2);
    for (int I = 0; I < means1.length; i++) {
        means1[i] = (wcounts1[i] * means1[i] +
                    wcounts2[i] * means2[i]) /
                    (wcounts1[i] + wcounts2[i]);
    }
    Means.setData(s1, means1);
}
```

This method computes a pooled estimate of the mean using weighted samples. When exact formulas for sufficient statistics are unavailable, then the Merge method must produce a result that is improbably distinguishable from a global computation on the pooled data sources.

A typical run of the Merge method, as shown in FIG. 4, includes the following steps. Again, several preliminary steps are performed. First, an input model already computed by an external analytic in its Pass method or Stream method is identified. Second, an Analytic object (such as Regression, Principal Component, etc.) is constructed. Third, the Analytic object, in its constructor, is provided with the results of a previously-computed model (encapsulated in a Summaries object). Fourth, a Parameters object is constructed to specify parameters for the analysis (number of predictor variables, number of components, etc.). Fifth, the Analytic is provided with a copy of the Parameters object.

The Merge method of the Analytic is then invoked, and the Merge method is provided with a copy of a previously-computed Summaries object (from a Pass or Stream operation). The Merge method instructs the first Summaries object (provided to the constructor of the Analytic) to merge itself with the second Summaries object (provided as an argument to the Merge method). The first Summaries object accomplishes the merge by instructing hierarchically all of its child objects to merge themselves. Ultimately, this means that the Statistic objects (Mean, Minimum, Maximum, etc.) perform the merging of themselves by using their unique formulas. Upon completion, the Merge method returns a merged Summaries object.

Summaries objects are used to score rows of new data. Thus, for each Analytic there is a parallel Scoring object. The Scoring object rests on the same base classes as the Analytic object. This allows the Scoring object to interpret the structure of Summaries and perform the necessary calculations for applying the Analytic algorithm to a row of data. The Scoring object can apply an analytic scoring algorithm to a single row of data in real time, for example, in a transactional database system, or to an entire table embedded in a database, or to a row of data in a continuous stream.

Figure 5:
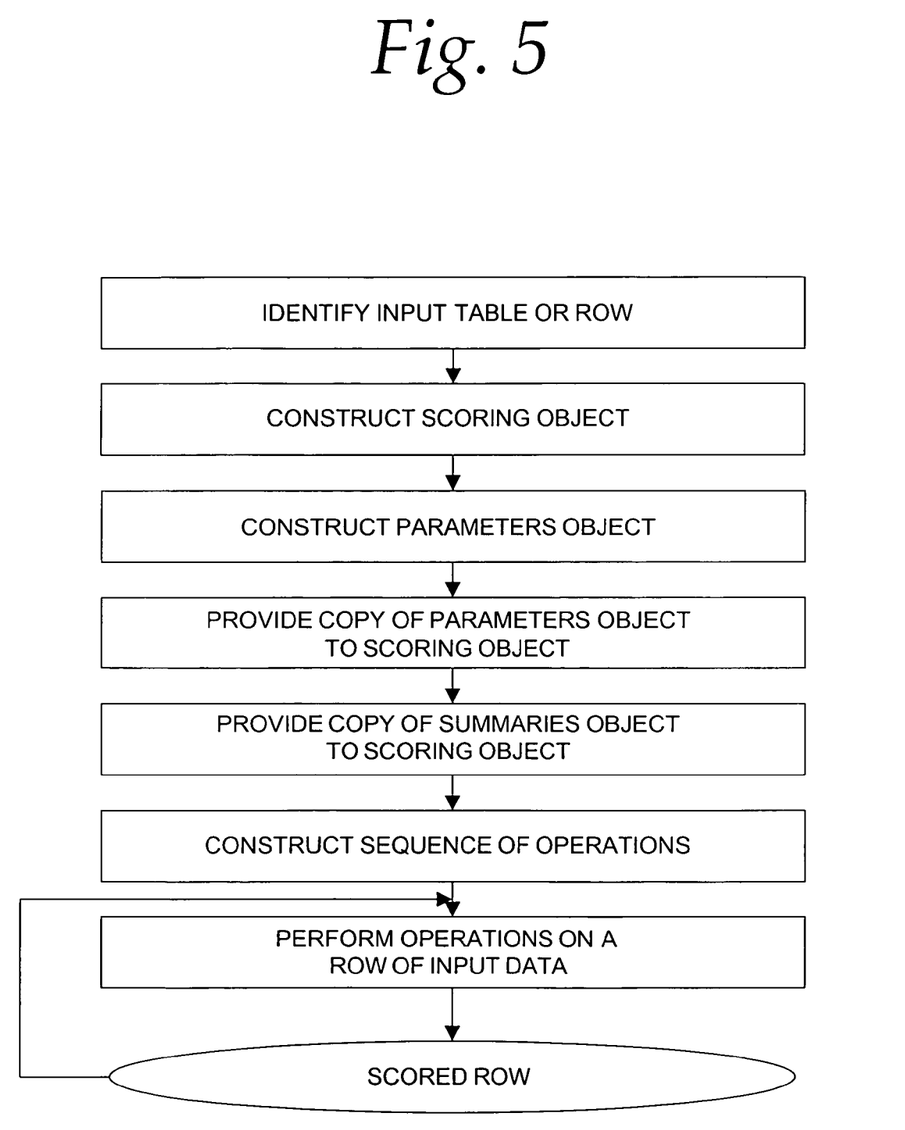
FIG. 5 is a flowchart of the Scoring sequence of the invention.

As shown in FIG. 5, a typical scoring sequence is as follows. First, an input data table or row is identified. Second, a Scoring object (such as Regression, Principal Components, etc.) is constructed. Third, a Parameters object is constructed to specify parameters for the analysis, such as number of predictor variables, number of components, etc. Fourth, the Scoring object is provided with a copy of the Parameters object. Fifth, the Scoring object is provided with a copy of a pre-computed Summaries object (from a Pass, Stream or Merge operation).

The Scoring method is invoked on the identified data table or row. The Score method structures the sequence of operations to be performed separately for each group if a grouping parameter is present. The Score method causes the sequence of sub-algorithms to be executed sequentially on each row of the input table or stream. The Score method outputs a scored row for each input row.

A number of scenarios will now be described to illustrate how the integrated PSM architecture offers analytic capabilities not possible in traditional prior art component systems. Currently, most users want to build traditional scoring systems using static analytic models. The following scenarios will show the rich alternatives possible with PSM.

The first scenario relates to credit scoring applications. Credit scores are the foundation of modern lending, including home mortgages, automobile loans, credit card offers and instant credit on the Internet. Credit scores can determine whether an individual will be offered a loan, and the terms of the loan, without further investigation. A credit score is typically a number between 300 and 850 which is generated by a formula based on information in the individual's credit report.

Most people have credit scores between about 600 and 800. A score of 720 or higher will generally assure the most favorable interest rates on a mortgage, according to Fair Isaac Corporation, the company that developed the credit score. The Fair Isaac model looks at more than twenty factors in the following five categories: (1) How bills are paid (35% of score); (2) Amount of money owed and amount of credit available (30%); (3) length of credit history (15%); (4) Mix of credit (10%); and (5) New credit applications (10%). The Fair Isaac scoring model does not consider certain other factors, including age, race, job or length of employment, income, education, marital status, whether one has been turned down for credit, length of time at current address, and whether one owns or rents a home.

Figure 6:
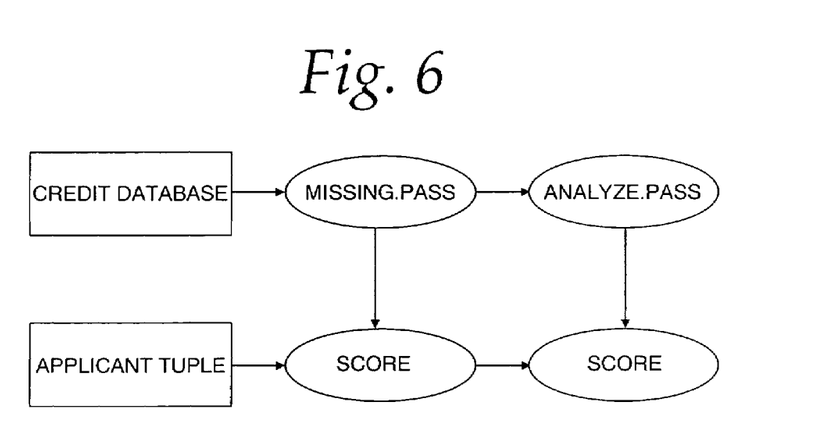
FIG. 6 is a block diagram of a credit scoring process as modeled by the PSM system.

The PSM system would model a credit scoring process as shown in FIG. 6. The Missing analytic uses the Pass method to estimate missing values in the credit history database. The imputed data are then sent to the appropriate Analytic (e.g., Trees, Regression, etc.). This creates a model to use for scoring application credit data. An applicant tuple containing credit history data for an applicant is sent to a Missing data Score class. This imputes missing values and creates a full tuple of values for the final scoring of the analytic model.

An unusual aspect of the credit scoring example is the handling of missing values. By chaining components in both the analytic and scoring phases of the operation, the PSM system is able to handle missing values. The missing values are scored using a maximum-likelihood model fitted to the full credit database.

A second scenario relates to marketing graphics. Market researchers frequently use graphics to help customers understand complicated models. Traditionally, marketing graphics were embedded in large printed or electronic (PDF) documents. More recently, they are being provided in Web-based and interactive forms so that customers can explore models in more detail.

Figure 7:
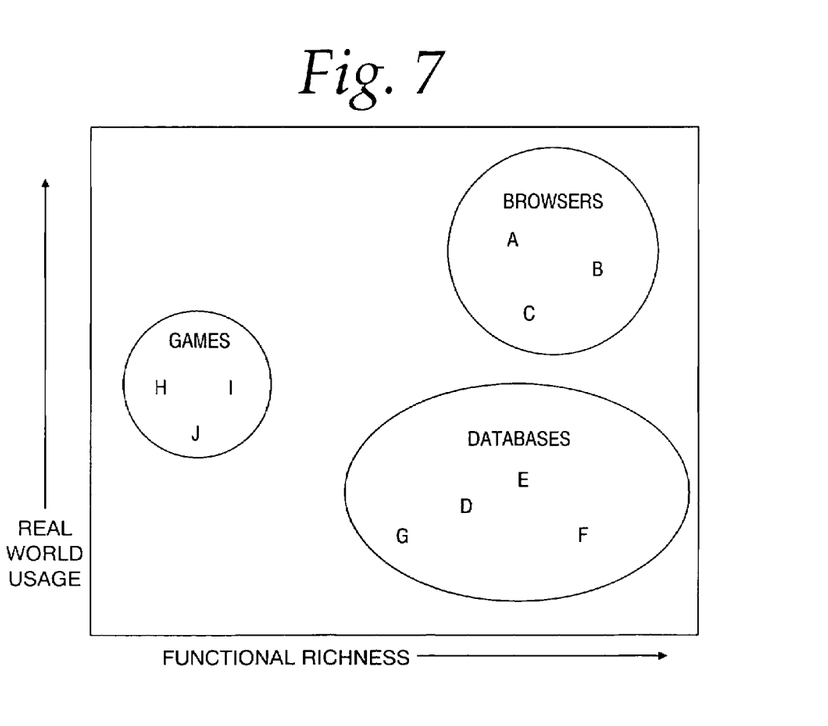
FIG. 7 is an example of a marketing analytic graphic.

FIG. 7 shows a typical example of one of these marketing graphics, namely a projection of component features. This type of scatter plot is useful for displaying trends in evolving companies, products or market segments. Other charts used for this general purpose are bubble plots and pyramid charts. Interactive versions of these charts require both real-time analytics and display components. Drill-down, brushing and exploratory tools require fitting sub-models, transforming data and other operations that cannot be done in a single pass through a static table or database.

Figure 8:
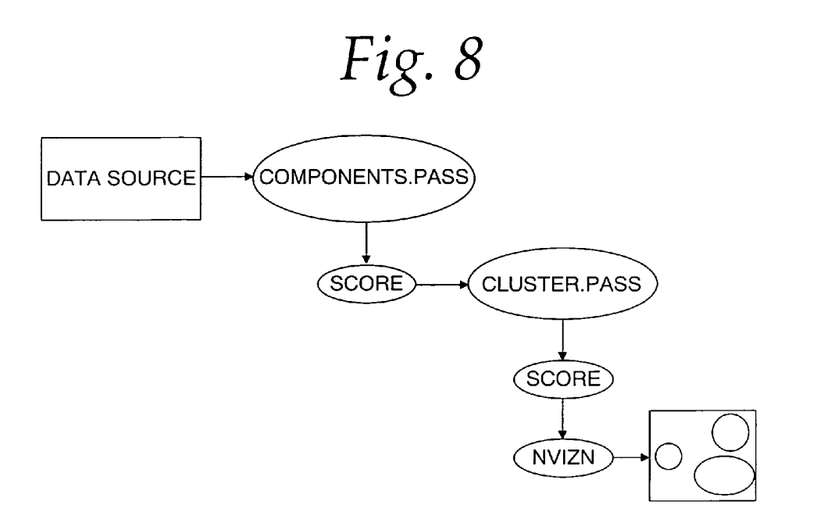
FIG. 8 is a flowchart showing the construction of an analytic graphic like that of FIG. 7 using the PSM system.

The PSM architecture shown in FIG. 8 illustrates an example that incorporates analytic modeling and display of data to produce the type of chart shown in FIG. 7. In many market research applications, there are hundreds or thousands of variables that are candidates for describing attributes or performance of products or companies. Products cannot, however, be displayed in high-dimensional space. Thus, a preliminary step in such cases is to find a 2-dimensional or 3-dimensional subspace of the variable space in which the products can be displayed. For example, MDS or Principal Components Analysis may be used to compute this subspace, and the MDS dimensions or components can then be displayed in a scatter plot.

The example of FIG. 8 adds another step to this process. It may be desirable to cluster products and color-code the products by cluster membership. The PSM system is used to compute the principal components of the data, score the components, feed the scores to the Cluster analytic, score the clusters, and send the result to a display engine (such as the nViZn® geometric analytical engine from SPSS, Inc.) for display. This results in a 2-dimensional scatter plot of products colored by cluster membership.

The graphic thus produced can easily be made interactive. If the data change and PSM are embedded in a Web services environment with a supervising client, the graph will be redrawn whenever the data are changed, sliced or subsetted.

The graphic can also be animated. If the Stream method is used to allow this graphic to monitor a data stream, the points will move every time a new data tuple enters the stream.

Alternately, products can be clustered in high-dimensional space before computing the principal components. This requires simply exchanging the Components and Cluster analytics in the data flow shown in FIG. 8.

In another scenario, the PSM system can be applied to a process control environment to provide self-adjusting models. Sometimes scoring models drift out of fit irregularly. Traditional analytic systems refit these models periodically, e.g., once an hour, once a day, once a week or once in another regular interval of time. Unfortunately, refitting models at regular intervals may allow them to drift dangerously outside process tolerances before the next interval ticks.

The PSM system offers several alternatives to overcome this problem. One approach is to refit models every time a Score is run. The Stream method is used, and the scores reflect the current state of the model in a moving data window. This requires, however, that the scoring data source contain the criterion itself (referred to as supervised learning), and this is unlikely since scoring is usually performed because there is no score in the first place. An alternate approach is to monitor the distribution of the scores and compare this distribution to that of the scores on the original modeled dataset. This approach is illustrated in FIG. 9.

Figure 9:
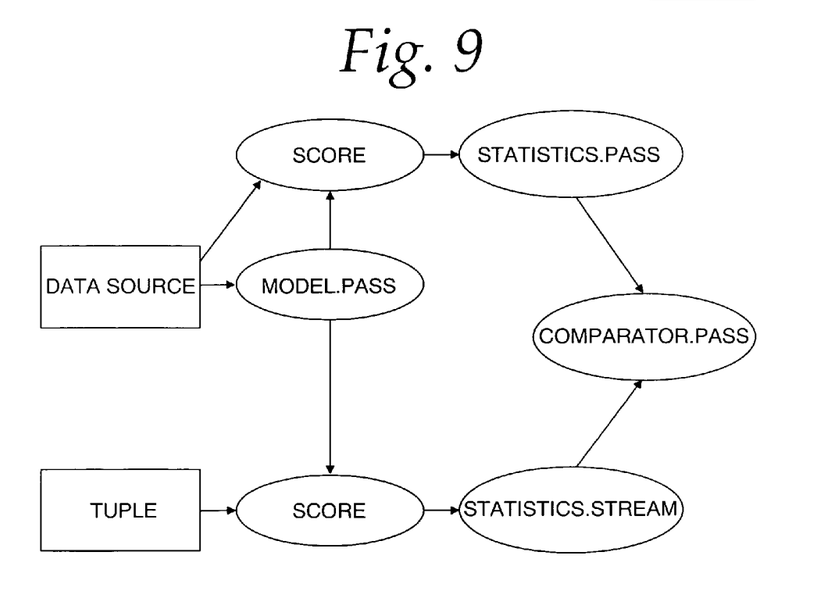
FIG. 9 is a diagram of a PSM adaptive scoring application.

As shown in FIG. 9, the Model analytic uses the Pass method to compute an analysis on the original data source. The resulting model is sent to two different scorers. One scores incoming tuples; the other scores the original data. The scores from both sources are sent to Statistics analytics, one of which uses the Pass method (for the original data) and one of which uses the Stream method (for the tuples). The Statistics analytics compute the mean score and the standard errors of the scores. The Comparator analytic then compares these two sets of statistics. If they are significantly different, it means that the mean score or the standard error of the scores is drifting apart. The output of the Comparator analytic can be used to control the modeling on the original data, and ultimately to adjust one or more parameters in the process being controlled.

Another scenario illustrates the application of the PSM system to sensor networks, which will be described with reference to a particular sensor network. The highways in Chicago, Ill. were among the first in the United States to be equipped with traffic sensors. These sensors consist of single inductive loops buried in the roadway pavement less than one mile apart. Each sensor is assigned a unique frequency signal which identifies its location. The sensors work by detecting changes in inductance. The sensor loops turn on and off as vehicles pass over them. Data from the sensors are transmitted for further processing via telephone lines to a central facility. The number of "on" signals within a defined time interval, e.g., 30 seconds, determines one of the most commonly used traffic variables, called occupancy, which is defined as the percentage of time that a point on the road is occupied by vehicles.

Figure 10:
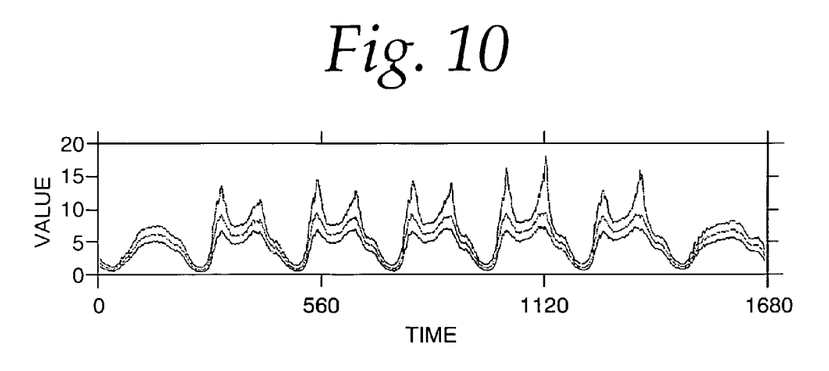
FIG. 10 is a graph of a series of sensor data.

The annual series for each sensor consists of measurements at six-minute intervals through the year, comprising 87,600 time points (10 points per hour×24 hours per day×365 days). The full data source contains 830 of these sensor series, so that there are almost 73 million data points in one year's measurements. FIG. 10 shows a series for a cluster of sensors aggregated across 1,680 six-minute time points for a week. The first cycle in the plot covers a Sunday and the last cycle covers a Saturday. This series reveals a pattern found in almost all the series, namely, the daily commuter periods show a higher occupancy rate (and, presumably, slower speeds). Not surprisingly, each weekday cycle shows a peak in the morning and a peak in the evening. Weekend occupancy rates are, of course, lower.

The sensor data may be used in various ways. For example, it may be desirable to construct an alert system that will trigger an alarm for a sensor if the occupancy rate deviates from the norm. The traditional way of implementing this is to set an arbitrary occupancy change value (e.g., 10%) and trigger the alarm if the value between two sensors differs by more than this amount. This approach works well for many situations, including traffic accidents which cause an almost immediate change. But it rests on an arbitrary criterion, and is unable to deal with gradual changes that might occur over several sensors in a longer time period.

Figure 11:
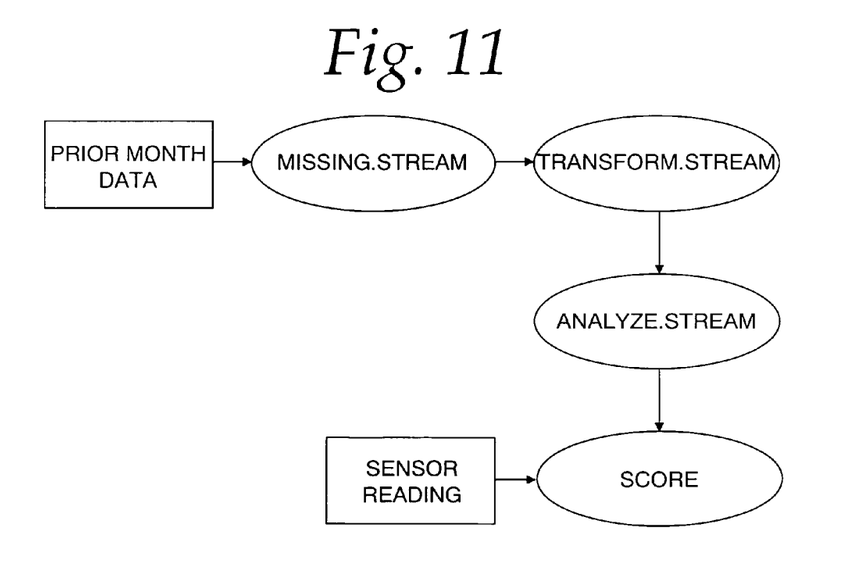
FIG. 11 is a diagram showing modeling of the series of FIG. 10 using the PSM system.

It may be desirable to predict traffic patterns for the short term (minutes) and longer term (weeks). Statistical modeling is needed to solve this problem. However, it is not possible to simply mine one year's data for deriving a prediction model, because too many variables change from year to year. For example, there are precipitation events, sensor malfunctions, holidays, special events and other variables that affect occupancy rates. Thus, a meaningful forecast must be based on a moving window of data. A PSM system may be used to model a prior month's data, and that model may be used to predict the current week's traffic, as shown in FIG. 11. The prior month data is sent through the Missing analytic in order to impute missing values in the series. The imputed series is then sent to a Transform analytic in order to arcsine transform the series (since occupancy is on a percent scale). The Analyze.stream icon in FIG. 11 represents one or more analytic modules that are concatenated to perform the statistical modeling. Each of the analytics is invoked through the Stream method so that the analysis will always cover only the prior month's data. The model produced by the analytics modules is provided to the Score module. One or more new data points (tuples) from the sensors are handed to the Score module, which scores the prediction in accordance with the model.

Traditionally, the business scoring problem has been framed in two steps: 1) fit a model (usually done daily, weekly or monthly) and 2) score the model (for one data point in a transaction environment or for a table of data in a batch processing environment). This approach works fairly well for data generated by a slowly-changing process, such as market surveys, credit scores and school achievement records. It is however unsuitable for applications involving real-time Web-based or sensor data, for which the PSM approach is well suited.

Figure 12:
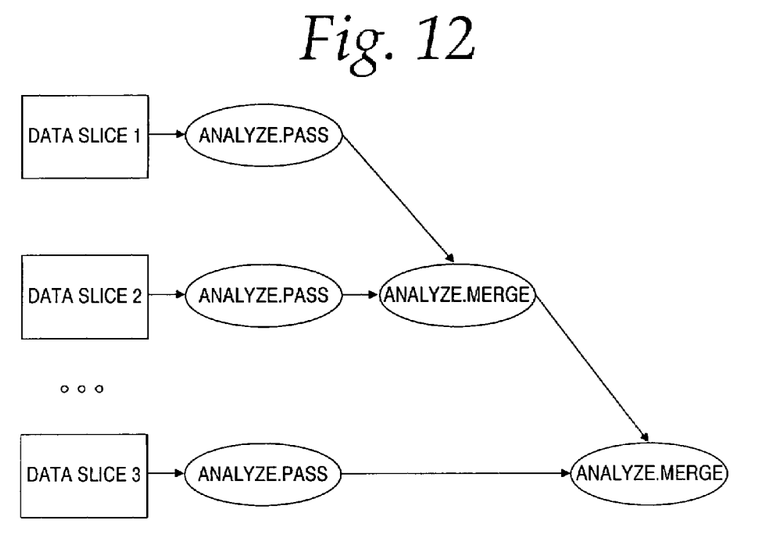
FIG. 12 is a diagram showing the computation of a grid model by the PSM system.

Yet another scenario relates to grid computing, which takes its name by analogy to the electric utility grid. The idea of grid computing is to parallelize computations so that separate nodes in the grid handle only small subsets of the total data. The final model is computed after all the results of the separate computations are merged. A PSM system computes a grid model as shown in FIG. 12. Each analytic is responsible for computing its sub-model on a slice of the data (in the example shown, the analytic runs the Pass method). The same analytic then merges its model with the model from another analytic. When the last model is merged, the overall model is completed. The overall model can then be passed to a scoring application. The overall flow is governed by a supervisor. This supervisor slices the data and schedules the analytic jobs and merges.

Figure 13:
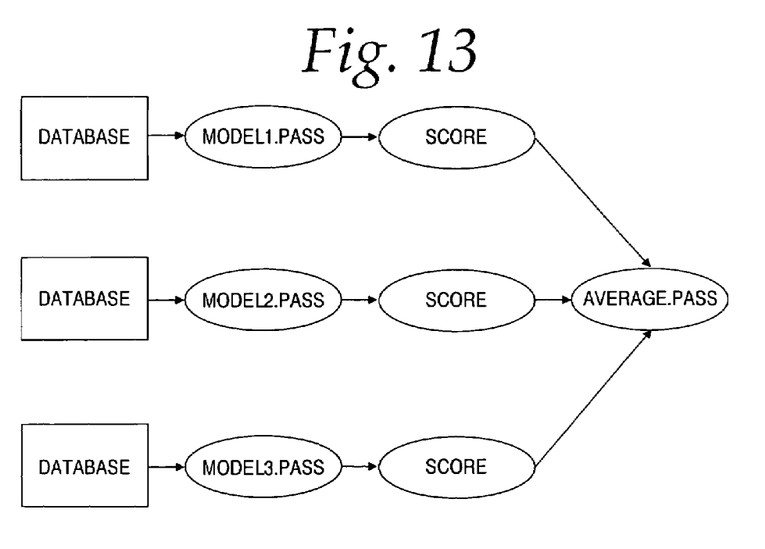
FIG. 13 is a diagram showing model averaging by the PSM system.

A final scenario relates to model averaging. It is well known that the average of the scores produced by several models has smaller prediction error in new samples than the score produced by a single "best" model. Computing model-average scores is readily performed in a PSM system. As shown in FIG. 13, the Averaging analytic receives scores from one or more analytics and outputs a single score. For more sophisticated averaging, such as Bayesian Model Averaging, a specialized PSM component may be used.

The embodiments of the invention described above are intended to be illustrative only, and should not be considered to limit the invention as set forth in the following claims. It will be understood by persons of skill in the art that the invention is capable of many changes, modifications and rearrangements without departing from the spirit of the invention.

What is claimed is:

1. A method for computing analytics on structured data comprising:
providing at least one data source; and
performing on a computer at least one statistical calculation on data from the data source by performing a pass data processing method, wherein the pass data processing method causes the statistical calculation to be completed in a single pass through the rows of an input data table from the data source and comprises:
identifying the input data table from the data source;
constructing an analytic object for performing an analysis;
constructing a parameters object to specify parameters for the analysis;
providing the analytic object with a copy of the parameters object;
invoking the pass method of the analytic on the identified data table;
constructing and initializing a set of statistics objects;
constructing a summary object and placing each statistics object in the summary object;
constructing a summaries object and collecting the entire hierarchy of objects constructed so far into the summaries object;
constructing a sequence of operations using the statistics objects in order to compute the analytic algorithm required for the constructed analytic object;
executing the sequence of operations sequentially on each row of the input data table;
instructing the summaries object to collect as summarized data the results of the operations; and
computing additional operations on the summarized data in the summaries object to produce a final estimated analytic model.

2. The method of claim 1 wherein:
the parameters object includes a grouping variable to identify a plurality of groups of data;
the constructing and initializing a set of statistics objects and constructing a summary object and placing each statistic object in the summary object are performed separately for each group of data; and
the sequence of operations is structured to be performed separately for each group of data.

3. A method for computing analytics on structured data comprising:
providing at least one data source; and
performing on a computer at least one statistical calculation on data from the data source by performing a stream data processing method, wherein the stream data processing method causes the statistical calculation to be performed on streaming data from the data source and comprises:
identifying an input data stream from the data source
constructing an analytic object for performing an analysis;
constructing a parameters object to specify parameters for the analysis;
providing the analytic object with a copy of the parameters object;
invoking the stream method of the analytic on the identified input data stream;
constructing and initializing a set of statistics objects;
constructing a summary object and placing each statistics object in the summary object;
constructing a summaries object and collecting the entire hierarchy of objects constructed so far into the summaries object;
constructing a sequence of operations using the statistics objects in order to compute the analytic algorithm required for the constructed analytic object;
executing the sequence of operations sequentially on each row of the input data stream;
instructing the summaries object to collect as summarized data the results of the operations; and
computing additional operations on the summarized data in the summaries object to produce a final estimated analytic model.

4. The method of claim 3 wherein:
the parameters object includes a grouping variable to identify a plurality of groups of data;
the constructing and initializing a set of statistics objects and constructing a summary object and placing each statistic object in the summary object are performed separately for each group of data; and the sequence of operations is structured to be performed separately for each group of data.

5. The method of claim 3 wherein the input rows of the stream are separated into two exclusive groups, a first group comprising rows to be added to the existing analysis and a second group comprising rows to be removed from the existing analysis, further comprising the step of repeatedly invoking the stream method, each time with additional row sets to be added and removed from the analysis.

6. A method for computing analytics on structured data comprising:

providing at least one data source; and performing on a computer at least one statistical calculation on data from the data source by scoring the data, wherein said scoring the data comprises:

identifying an input data table or data stream from a data source;

constructing a scoring object for performing an analysis;

constructing a parameters object to specify parameters for the analysis;

providing the scoring object with a copy of the parameters object;

providing the scoring object with a copy of a pre-computed summaries object;

invoking the scoring method of the analytic on the identified data table;

constructing a sequence of operations using the scoring object in order to compute the analytic algorithm required for the constructed scoring object; and executing the sequence of operations sequentially on each row of the input data table or data stream to produce a scored row for each input data row.

7. The method of claim 6 wherein the parameters object includes a grouping variable to identify a plurality of groups of data, and the sequence of operations is structured to be performed separately for each group of data.

8. The method of claim 6 wherein scoring is performed in about real time.

9. A method for computing analytics on structured data comprising:

providing at least one data source;

providing a statistics object for computing statistical estimates;

providing software capable of performing a pass data processing method, a stream data processing method and a merge data processing method; and performing on a computer at least one statistical calculation on data from the data source using the statistics object to compute statistical estimates by performing at least one method selected from the provided data processing methods wherein a user selects which data processing method is used.

10. A data processing system for computing analytics on structured data comprising:

a computer having a memory for storing statistics;

at least one data source; and software on the computer, the software capable of performing a pass data processing method, wherein the pass data processing method causes a statistical calculation to be completed in a single pass through the rows of an input data table from the data source and comprises:

identifying the input data table from the data source;

constructing an analytic object for performing an analysis;

constructing a parameters object to specify parameters for the analysis;

providing the analytic object with a copy of the parameters object;

invoking the pass method of the analytic on the identified data table;

constructing and initializing a set of statistics objects;

constructing a summary object and placing each statistics object in the summary object;

constructing a summaries object and collecting the entire hierarchy of objects constructed so far into the summaries object;

constructing a sequence of operations using the statistics objects in order to compute the analytic algorithm required for the constructed analytic object;

executing the sequence of operations sequentially on each row of the input data table;

instructing the summaries object to collect as summarized data the results of the operations; and computing additional operations on the summarized data in the summaries object to produce a final estimated analytic model.

11. A data processing system for computing analytics on structured data comprising:

a computer having a memory for storing statistics at least one data source; and software on the computer, the software capable of performing a stream data processing method, wherein the stream data processing method causes a statistical calculation to be performed on streaming data from the data source and comprises:

identifying an input data stream from the data source;

constructing an analytic object for performing an analysis;

constructing a parameters object to specify parameters for the analysis;

providing the analytic object with a copy of the parameters object;

invoking the stream method of the analytic on the identified input data stream;

constructing and initializing a set of statistics objects;

constructing a summary object and placing each statistics object in the summary object;

constructing a summaries object and collecting the entire hierarchy of objects constructed so far into the summaries object;

constructing a sequence of operations using the statistics objects in order to compute the analytic algorithm required for the constructed analytic object;

executing the sequence of operations sequentially on each row of the input data stream;

instructing the summaries object to collect as summarized data the results of the operations; and computing additional operations on the summarized data in the summaries object to produce a final estimated analytic model.

12. A data processing system for computing analytics on structured data comprising:

a computer having a memory for storing statistics at least one data source; and software on the computer, the software capable of performing a merge data processing method, wherein the merge data processing method comprises:

identifying an input model already computed by an analytic;

constructing an analytic object for performing an analysis;

constructing a parameters object to specify parameters for the analysis;

providing the analytic object with a copy of the parameters object;

invoking the merge method of the analytic on the identified input model;
providing the merge method with a copy of a first previously-computed summaries object; and
instructing the first previously-computed summaries object to merge itself with a second previously-computed summaries object to produce a final merged summaries object.

13. The system of claim 12 further comprising a second computer for calculating the second previously-computed summaries object.

14. The system of claim 12 wherein the computer is a supervisor of a plurality of nodes in a grid computing system, each node having its own computer for executing a pass or stream data processing method.

15. A computer program product comprising
a storage medium having computer software encoded in a machine readable format for analyzing structured data, the software comprising:
a set of computer instructions for retrieving data from at least one data source; and
a set of computer instructions for performing a pass data processing method, wherein the pass data processing method causes the statistical calculation to be completed in a single pass through the rows of an input data table from the data source and comprises:
identifying the input data table from the data source;
constructing an analytic object for performing an analysis;
constructing a parameters object to specify parameters for the analysis;
providing the analytic object with a copy of the parameters object;
invoking the pass method of the analytic on the identified data table;
constructing and initializing a set of statistics objects;
constructing a summary object and placing each statistics object in the summary object;
constructing a summaries object and collecting the entire hierarchy of objects constructed so far into the summaries object;
constructing a sequence of operations using the statistics objects in order to compute the analytic algorithm required for the constructed analytic object;
executing the sequence of operations sequentially on each row of the input data table;
instructing the summaries object to collect as summarized data the results of the operations; and
computing additional operations on the summarized data in the summaries object to produce a final estimated analytic model.

16. A computer program product comprising
a storage medium having computer software encoded in a machine readable format for analyzing structured data, the software comprising:
a set of computer instructions for retrieving data from at least one data source; and
a set of computer instructions for performing a stream data processing method, wherein the stream method causes the statistical calculation to be performed on streaming data from the data source and comprises:
identifying an input data stream from the data source;
constructing an analytic object for performing an analysis;
constructing a parameters object to specify parameters for the analysis;
providing the analytic object with a copy of the parameters object;
invoking the stream method of the analytic on the identified input data stream;
constructing and initializing a set of statistics objects;
constructing a summary object and placing each statistics object in the summary object;
constructing a summaries object and collecting the entire hierarchy of objects constructed so far into the summaries object;
constructing a sequence of operations using the statistics objects in order to compute the analytic algorithm required for the constructed analytic object;
executing the sequence of operations sequentially on each row of the input data stream;
instructing the summaries object to collect as summarized data the results of the operations; and
computing additional operations on the summarized data in the summaries object to produce a final estimated analytic model.

17. A computer program product comprising
a storage medium having computer software encoded in a machine readable format for analyzing structured data, the software comprising:
a set of computer instructions for retrieving data from at least one data source; and
a set of computer instructions for performing a merge data processing method, wherein the merge data processing method comprises:
identifying an input model already computed by an analytic;
constructing an analytic object for performing an analysis;
constructing a parameters object to specify parameters for the analysis;
providing the analytic object with a copy of the parameters object;
invoking the merge method of the analytic on the identified input model;
providing the merge method with a copy of a first previously-computed summaries object; and
instructing the first previously-computed summaries object to merge itself with a second previously-computed summaries object to produce a final merged summaries object.

18. A computer method for computing analytics using statistics objects, an analytic object and a summaries object on structured data:
in which at least one data source and software capable of performing a pass data processing method and a stream data processing method are provided, in which a computer performs at least one statistical calculation on data from the data source using the software for at least one of the provided data processing methods, the computer method comprising:
constructing a sequence of operations using the statistics objects in order to compute the analytic algorithm required for the analytic object;
executing the sequence of operations sequentially on each row of the data source;
instructing the summaries object to collect as summarized data the results of the operations; and
computing additional operations on the summarized data in the summaries object to produce a final estimated analytic model.

19. The method of claim 18 further comprising a merge data processing method comprising:
identifying an input model already computed by an analytic;
constructing an analytic object for performing an analysis;

constructing a parameters object to specify parameters for the analysis;

providing the analytic object with a copy of the parameters object;

invoking the merge method of the analytic on the identified input model;

providing the merge method with a copy of a first previously-computed summaries object; and instructing the first previously-computed summaries object to merge itself with a second previously-computed summaries object to produce a final merged summaries object.

20. The method of claim 19 wherein the first summaries object performs the merge by instructing hierarchically all of its child objects to merge themselves.

21. The method of claim 19 wherein the first previously-computed summaries object was computed by a first processor of a distributed computer system and the second previously-computed summaries object was computed by a second processor of the distributed computer system.

22. The method of claim 18 further comprising automatically selecting the data processing method to be used based on the type of data in the data source and the desired statistical calculation.

23. The computer method of claim 18 wherein the at least one method further comprises:

constructing an analytic object for performing an analysis;

constructing a parameters object to specify parameters for the analysis;

providing the analytic object with a copy of the parameters object;

constructing and initializing a set of the statistics objects;

constructing a summary object and placing each statistics object in the summary object; and constructing the summaries object.

24. The computer method of claim 18 wherein the at least one method further comprises:

identifying an input data table from the data source; and invoking the pass method of the analytic on the identified data table.

25. The computer method of claim 18 wherein the at least one method further comprises:

identifying an input data stream from the data source; and invoking the pass method of the analytic on the identified data stream.

26. A data processing system for computing analytics on structured data comprising:

a computer having a memory for storing statistics;

at least one data source; and software on the computer, the software capable of performing a pass data processing method and a stream data processing method using statistics objects, an analytic object and a summaries object;

wherein at least one of the provided data processing methods comprises:

constructing a sequence of operations using the statistics objects in order to compute the analytic algorithm required for the analytic object;

executing the sequence of operations sequentially on each row of the data source;

instructing the summaries object to collect as summarized data the results of the operations; and computing additional operations on the summarized data in the summaries object to produce a final estimated analytic model.

27. The system of claim 26 wherein the at least one method further comprises:

constructing an analytic object for performing an analysis;

constructing a parameters object to specify parameters for the analysis;

providing the analytic object with a copy of the parameters object;

constructing and initializing a set of the statistics objects;

constructing a summary object and placing each statistics object in the summary object; and constructing the summaries object.

28. A computer program product comprising a storage medium having computer software encoded in a machine readable format for analyzing structured data, the software comprising:

a set of computer instructions for retrieving data from at least one data source;

a set of computer instructions for performing a pass data processing method;

a set of computer instructions for performing a stream data processing method; and a set of computer instructions to perform at least one statistical calculation on data from the data source to compute statistical estimates by at least one method selected from the pass and stream data processing methods, the at least one method comprising:

constructing a sequence of operations using the statistics objects in order to compute the analytic algorithm required for the analytic object;

executing the sequence of operations sequentially on each row of the data source;

instructing the summaries object to collect as summarized data the results of the operations; and computing additional operations on the summarized data in the summaries object to produce a final estimated analytic model.

29. The computer program product of claim 28 further comprising a scoring object for interpreting the structure of the summaries and applying a scoring algorithm to the data.

30. The computer program product of claim 28 wherein the at least one method further comprises:

constructing an analytic object for performing an analysis;

constructing a parameters object to specify parameters for the analysis;

providing the analytic object with a copy of the parameters object;

constructing and initializing a set of the statistics objects;

constructing a summary object and placing each statistics object in the summary object; and constructing the summaries object.

* * * * *